(12) United States Patent
Zhang et al.

(10) Patent No.: US 11,649,181 B2
(45) Date of Patent: May 16, 2023

(54) TREATMENT SYSTEM FOR CEPHALOSPORIN WASTEWATER AND TREATMENT METHOD THEREOF

(71) Applicant: NANJING YANCHANG REACTION TECHNOLOGY RESEARCH INSTITUTE CO., LTD., Nanjing (CN)

(72) Inventors: Zhibing Zhang, Nanjing (CN); Zheng Zhou, Nanjing (CN); Feng Zhang, Nanjing (CN); Lei Li, Nanjing (CN); Weimin Meng, Nanjing (CN); Baorong Wang, Nanjing (CN); Gaodong Yang, Nanjing (CN); Huaxun Luo, Nanjing (CN); Guoqiang Yang, Nanjing (CN); Hongzhou Tian, Nanjing (CN); Yu Cao, Nanjing (CN)

(73) Assignee: NANJING YANCHANG REACTION TECHNOLOGY RESEARCH INSTITUTE CO. LTD., Nanjing (CN)

(\*) Notice: Subject to any disclaimer, the term of this patent is extended or adjusted under 35 U.S.C. 154(b) by 5 days.

(21) Appl. No.: 17/778,418

(22) PCT Filed: May 27, 2020

(86) PCT No.: PCT/CN2020/092674
§ 371 (c)(1),
(2) Date: May 20, 2022

(87) PCT Pub. No.: WO2021/128727
PCT Pub. Date: Jul. 1, 2021

(65) Prior Publication Data
US 2022/0402787 A1 Dec. 22, 2022

(30) Foreign Application Priority Data

Dec. 23, 2019 (CN) .......................... 201911334046.6

(51) Int. Cl.
*C02F 1/52* (2006.01)
*C02F 1/72* (2023.01)
(Continued)

(52) U.S. Cl.
CPC ............ *C02F 1/5281* (2013.01); *C02F 1/727* (2013.01); *C02F 3/02* (2013.01); *C02F 9/00* (2013.01);
(Continued)

(58) Field of Classification Search
None
See application file for complete search history.

(56) References Cited

FOREIGN PATENT DOCUMENTS

| CN | 204873990 U | 12/2015 |
|----|-------------|---------|
| CN | 209352710 U | 9/2019 |

OTHER PUBLICATIONS

Cui Haiyun et al., "Engineering Design of Cephalosporin High Concentration Wastewater Treatment", <<Industrial Water and Wastewater>>, vol. 43, No. 3, pp. 71-73. Jun. 28, 2012.

*Primary Examiner* — Chester T Barry

(57) ABSTRACT

A treatment system and method for cephalosporin wastewater are disclosed. The treatment system includes: a flocculation and sedimentation device, an alkali reaction tank, a PAC reaction tank, a PAM reaction tank, a wastewater heat exchanger, a wastewater heater and an oxidation reactor that are connected with each other in sequence, wherein the wastewater heat exchanger is provided with a material inlet, a material outlet, a heat source inlet and a heat source outlet. An oxidized water from the oxidation reactor enters the wastewater heat exchanger from the heat source inlet, the heat source outlet is connected with a product canister, the product canister is connected with a membrane filtration device to realize concentration treatment of a landfill leachate, the material inlet is connected with the PAM (Continued)

reaction tank, and the material outlet is connected with the wastewater heater. An outer side of the oxidation reactor is provided with a micro-interfacial generation system for dispersing and breaking a gas into bubbles. The treatment system of the prevent invention improves the contact of reaction phase interfaces after arranging the micro-interfacial generation system, which ensures a good wastewater treatment effect under relatively mild operating conditions.

7 Claims, 1 Drawing Sheet

(51) Int. Cl.
*C02F 9/00* (2023.01)
*C02F 3/02* (2023.01)
C02F 103/34 (2006.01)
C02F 1/00 (2023.01)

(52) U.S. Cl.
CPC .... *C02F 2001/007* (2013.01); *C02F 2101/40* (2013.01); *C02F 2103/343* (2013.01); *C02F 2209/02* (2013.01); *C02F 2209/03* (2013.01); *C02F 2209/08* (2013.01)

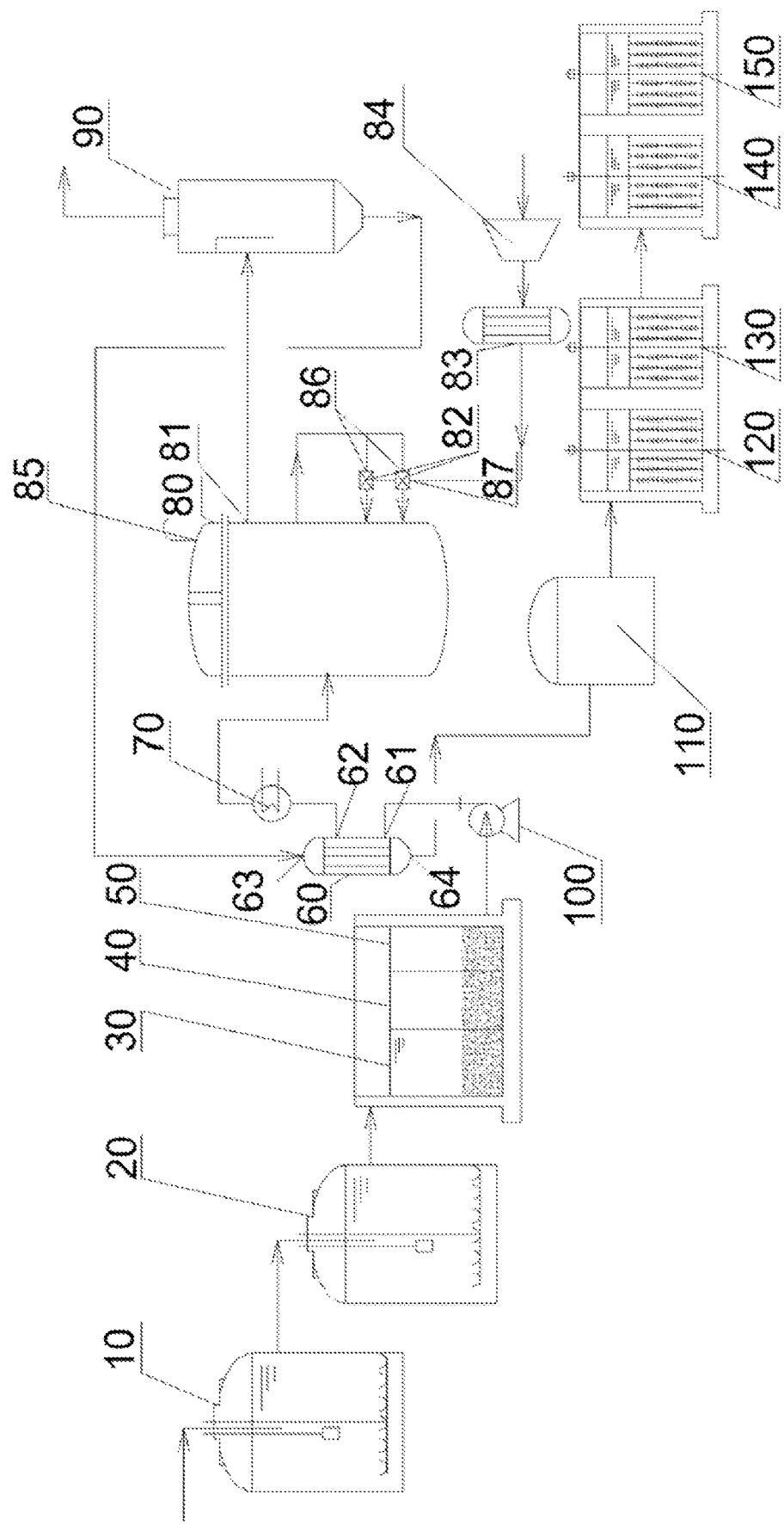

TREATMENT SYSTEM FOR CEPHALOSPORIN WASTEWATER AND TREATMENT METHOD THEREOF

FIELD OF THE INVENTION

The present invention relates to the technical field of cephalosporin wastewater treatment, in particular to a treatment system for cephalosporin wastewater and a treatment method thereof.

BACKGROUND OF THE INVENTION

Our country is a major producer of antibiotics, but also a major country of antibiotic use. Cephalosporin is the most representative and most widely used antibiotics. Cephalosporin wastewater has complex composition and high bio-inhibition. It is a kind of high-content organic pharmaceutical wastewater with a variety of refractory and bio-toxic substances such as lipids, alcohols, fermentation metabolites, mycelium and antibiotic residues. It has the characteristics of high COD, complex composition and high chromaticity. It is a type of organic wastewater that is difficult to treat with high content, and is difficult to be efficiently treated by biological methods.

In the prior art, anaerobic-aerobic (A/O) biochemical methods are generally used to treat the above-mentioned types of wastewater, with a specific process of operating engineering-scale anaerobic reactors stably when the inlet COD is not higher than 5.0 g/L and the volume load is 1.6 kg/(m3·d) and remaining a total COD removal rate of A/O as 90%. However, operating conditions of low load and low inlet COD mean that anaerobic reactors must have larger volumes and more dilution water, which will undoubtedly increase investment cost and operating cost of wastewater treatment projects. In laboratories, A/O is often used as the main process, and enhanced advanced processes such as using Fenton reagent method and MBR membrane method may achieve expected results. However, the Fenton oxidation method has high operating costs and produces a large amount of chemical sludge; the MBR membrane method requires high investment and are prone to pollution and damage.

Therefore, direct use of biochemical methods to treat the cephalosporin wastewater cannot achieve good treatment results, while the wet oxidation method greatly improves biodegradability of the wastewater for such industrial wastewater with high concentration that is difficult to be biodegraded. Especially during the treatment of the organic wastewater with high concentration, high toxicity and high chromaticity, the wet oxidation method is a particularly effective method.

However, the wet oxidation technology in the prior art is applied under relatively-high temperature and relatively-high pressure, wherein the temperature reaches 130-150° C., and the pressure reaches 1-2 MPa. Under such operating conditions with high temperature and high pressure, not only the requirements for the equipment are relatively high, the energy consumption is high, the cost is high, but also the operation safety is reduced so that the equipment is prone to aging and damage. During the reaction oxidation process, the residence time of oxygen in the reactor is short, and most of the oxygen floats out of the reactor without sufficient reaction, which reduces the reaction efficiency and increases the treatment cost.

In view of this, the prevent invention is proposed.

SUMMARY OF THE INVENTION

A first objective of the prevent invention is to provide a treatment system for cephalosporin wastewater. Through the provision of a micro-interfacial generator during a wet oxidation reaction process, the treatment system improves mass transfer effects between two phases, thereby increasing an interfacial area between a gas phase and a liquid phase so that the oxygen is better fused with the cephalosporin wastewater to form a gas-liquid emulsion for improving oxidation reaction efficiency, and the oxygen stays in the cephalosporin wastewater for a longer time for further improving the reaction efficiency and increasing the mass transfer effects of interfaces of reaction phrases. Therefore, operating temperatures and operating pressures is appropriately reduced, and the safety is also improved accordingly. The prevent invention has advantages of low energy consumption, low cost, and excellent treatment effect.

A second objective of the prevent invention is to provide a treatment method for cephalosporin wastewater using the above treatment system. The treatment method has advantages of simple operation, milder operation conditions and low energy consumption, and the removal rate of harmful substances in the treated cephalosporin wastewater may reach 99%.

In order to realize the above-mentioned objectives of the present invention, the following technical schemes are specially adopted.

A treatment system for cephalosporin wastewater is provided in the present invention, including: a flocculation and sedimentation device, an alkali reaction tank, a PAC reaction tank, a PAM reaction tank, a wastewater heat exchanger, a wastewater heater and an oxidation reactor that are connected with each other in sequence, wherein the wastewater heat exchanger is provided with a material inlet, a material outlet, a heat source inlet and a heat source outlet. An oxidized water from the oxidation reactor enters the wastewater heat exchanger from the heat source inlet, the heat source outlet is connected with a product canister, the product canister is connected with a membrane filtration device to realize concentration treatment of a landfill leachate, the material inlet is connected with the PAM reaction tank, and the material outlet is connected with the wastewater heater. An outer side of the oxidation reactor is provided with a micro-interfacial generation system for dispersing and breaking a gas into bubbles, and the micro-interfacial generation system comprises a plurality of micro-interfacial generators arranged side by side from top to bottom.

The cephalosporin wastewater required to be treated in the prevent invention has characteristics of complex composition and high bio-inhibition, and being a kind of high-content organic pharmaceutical wastewater with a variety of refractory and bio-toxic substances such as lipids, alcohols, fermentation metabolites, mycelium and antibiotic residues. In the prior art, anaerobic-aerobic (A/O) biochemical methods are generally used to treat the above-mentioned types of wastewater, but the investment cost and operating cost of the method are relatively high. In the laboratory, A/O method is often used as the main process, and enhanced advanced processes such as using Fenton reagent and MBR membrane method may achieve expected results. However, the Fenton oxidation method has high operating costs and produces a large amount of chemical sludge. Therefore, direct use of biochemical methods to treat the cephalosporin wastewater may not achieve good treatment results, while the wet oxidation method may greatly improve the biodegradability of the wastewater for such industrial wastewater with high concentration that is difficult to be biodegraded. Especially during the treatment of the organic wastewater with high concentration, high toxicity and high chromaticity, the wet oxidation method is a particularly effective method.

However, the wet oxidation technology in the prior art is applied under relatively-high temperature and relatively-high pressure, wherein the temperature can reach 130-150° C., and the pressure can reach 1-2 MPa. Under such operating conditions with high temperature and high pressure, not only the requirements for the equipment are relatively high, the energy consumption is high, the cost is high, but also the operation safety is reduced so that the equipment is prone to aging and damage; during the reaction oxidation process, the residence time of oxygen in the reactor is short, and most of the oxygen floats out of the reactor without sufficient reaction, which reduces reaction efficiency and increases treatment cost.

In order to solve the above technical problems, the prevent invention provides a treatment system specially designed for cephalosporin wastewater. In the treatment system, a wet oxidation treatment system is organically combined with a micro-interfacial generation system, air or oxygen entering an oxidation reaction device is broken and dispersed into bubbles through the provision of the micro-interfacial generation system on an outer side of an oxidation reactor, so that the bubbles and the wastewater form a gas-liquid emulsion, thereby increasing the interfacial area between the gas and the wastewater for further improving the reaction efficiency. The oxygen is incorporated into the wastewater as much as possible after the mass transfer effect of the interfaces of reaction phrases is increased. In this way, by improving the mass transfer effect, operating conditions of temperature and pressure is fully reduced. The pressure is between 0.2-0.4 MPa and the temperature is between 100-110° C., which may ensure the treatment of the wastewater under mild operating conditions.

The micro-interfacial generation system of the prevent invention includes a plurality of micro-interfacial generators arranged side by side from top to bottom. Since the plurality of micro-interfacial generators are built externally and the liquid and gas phases need to be connected to the plurality of micro-interfacial generators at the same time, each of the plurality of micro-interfacial generators is provided with a gas inlet for the gas phase and a wastewater inlet for the liquid phase. A landfill leachate recycled from the oxidation reaction enters the micro-interfacial generators from the wastewater inlet, and a supplemental fresh air or oxygen enters each of the plurality of micro-interfacial generators from the gas inlet, so that the gas phase and the liquid phrase contact with each other in the plurality of micro-interfacial generators, and gas is broken into micro-bubbles to improve the reaction operation.

Preferably, each of the plurality of micro-interfacial generators is provided with a gas inlet and a wastewater inlet. A wastewater recycled from the oxidation reactor enters the wastewater inlet, and a supplemental fresh air or oxygen enters the gas inlet.

Preferably, a number of the plurality of micro-interfacial generators is 2, and the plurality of micro-interfacial generators are connected in parallel with each other. The two micro-interfacial generators perform strengthening operations at the same time, which can further improve reaction efficiency of wet oxidation.

Furthermore, each of the plurality of micro-interfacial generators is preferably a pneumatic micro-interfacial generator. After the compressed air or oxygen is introduced into the micro-interfacial generator, the compressed air or oxygen is broken into micro-bubbles after contacting with the wastewater, so as to improve the mass transfer effect.

Those skilled in the art can understand that the micro-interfacial generator (MIG) may break the gas phase and/or the liquid phase in a multiphase reaction medium into micro-bubbles and/or micro-droplets with a diameter of micrometers in the micro-interfacial generator through a mechanical micro structure and/or a turbulent micro structure by way of a preset action mode to increase a mass transfer area between the gas phase and/or the liquid phase and the liquid phase and/or the solid phase in the reaction process and improve the mass transfer efficiency between the reaction phases, thereby enhancing multiphase reactions within a preset temperature range and/or a preset pressure range.

The preset action mode is selected from one or more of a micro channel action mode, a field force action mode and a mechanical energy action mode.

The above micro channel action mode is to break the gas phase and/or the liquid phase passing through the micro channel into micro-bubbles and/or micro-droplets by constructing a microstructure of flow channel; the above field force action mode is to use an external field force to input energy into a fluid in a non-contact way to break it into the micro-bubbles or micro-droplets; the above mechanical energy action mode is to use a mechanical energy of the fluid to convert the fluid into a surface energy of bubbles or droplets so that the bubbles or droplets are broken into the micro-bubbles or micro-droplets.

The micro-interfacial generator is used for the reaction of gas-liquid, liquid-liquid, liquid-solid, gas-liquid-liquid, gas-liquid-solid and liquid-liquid-solid and other multiphase reaction media. Its specific structure can be freely selected according to the different flowing media, and there are corresponding records in the prior patents and literatures about its specific structure and specific functions, which will not be repeated here. Meanwhile, the number and positions of the gas inlets may also be adjusted according to the actual engineering needs, such as a height, length, a diameter, a wastewater flow rate and other factors of the oxidation reaction device in this system, so as to achieve better gas supply effect and improve the degradation rate of the wastewater treatment by the wet oxidation.

Further, in the schemes of the prevent invention, before the wet oxidation process is performed, a flocculation and sedimentation device, an alkali reaction tank, a PAC reaction tank and a PAM reaction tank that are connected with each other in sequence are included, and the wastewater treated from the PAM reaction tank is then subjected to the next step of wet oxidation.

Preferably, the flocculation and sedimentation device includes a first flocculation and sedimentation tank and a second flocculation and sedimentation tank that are used to settle and separate flocs in the wastewater. The first flocculation and sedimentation tank is connected with the second flocculation and sedimentation tank. After flocculants are added in the flocculation and sedimentation tank, the wastewater is treated by precipitation, flocculation and sedimentation.

Preferably, in order to facilitate delivery, a delivering pump is disposed between the PAM reaction tank and the wastewater heat exchanger.

It should be noted that the PAC reaction tank is mainly added with aluminum chloride or aluminum hydroxychloride; and through its hydrolysates, colloids in sewage or sludge quickly form precipitation, which is convenient for separation of large particle precipitates.

The PAM reaction tank is mainly added with polyacrylamide, which has achieved the effect of removing impurities by coagulation.

Preferably, the treatment system further includes a facultative biological device that uses facultative microorganisms for incomplete anaerobic processing, wherein the wastewater from the product canister is communicated with the facultative biological device. The facultative biological device includes a first facultative biological tank and a second facultative biological tank, and the first facultative biological tank is connected with the second facultative biological tank.

Preferably, the treatment system further includes an aerobic device that uses aerobic microorganisms for decomposing small molecular substances in the wastewater, wherein the wastewater treated by the facultative biological device flows through the aerobic device. The aerobic device includes a first aerobic tank and a second aerobic tank, the first aerobic tank is connected with the first facultative biological tank, and the second aerobic tank is connected with the second facultative biological tank.

The facultative biological device and the aerobic device are used in conjunction with each other, so that the anaerobic microorganisms, the facultative microorganisms and the aerobic microorganisms may cooperate with each other to remove various organic substrates, nitrates and nitrites in the wastewater for improving the treatment effect. The facultative microorganisms may realize the conversion of macromolecular organic matter in the treated wastewater into micro-molecular organic matter, while the aerobic microorganisms directly decomposes the small molecules, and the facultative microorganisms and the aerobic microorganisms work together.

Preferably, the treatment system further includes an air compression device, wherein the air compression device is communicated with the gas inlet, and air or oxygen compressed by the air compression device enters the micro-interfacial generator through the gas inlet for dispersion and crushing. The compressed air or oxygen from the air compression device is preferably heated in a gas heating device first, and then enters the micro-interfacial generator. The gas heating device is preferably a heat exchanger, so the gas heating device is further provided on a pipeline connected between the air compression device and the gas inlet on the micro-interfacial generator.

Preferably, the treatment system further includes a gas-liquid separation tank, wherein an oxidized water from an oxidized water outlet provided on the oxidation reactor enters the gas-liquid separation tank to realize gas-liquid separation, and then enters the wastewater heat exchanger from the heat source inlet.

In the treatment system of the prevent invention, a pump body is disposed on the corresponding connecting pipeline according to actual needs.

The treatment system for cephalosporin wastewater of the prevent invention has high treatment power, and after the treatment performed by the treatment system, the prevent invention may ensure a relatively-high treatment effect under the condition of relatively-low energy consumption with a removal rate of harmful substances reaching 99%.

In addition, the prevent invention further provides a treatment method for cephalosporin wastewater, which includes steps of:

introducing the cephalosporin wastewater into the oxidation reactor after being heated, and introducing a compressed air or a compressed oxygen into the oxidation reactor for wet-oxidation process; and first dispersing and crushing the compressed air or the compressed oxygen entering the oxidation reactor through the plurality of micro-interfacial generators.

The above oxidation reaction has a reaction temperature of 100-110° C. and a reaction pressure between 0.2 MPa and 0.4 MPa. After using the micro-interfacial generation system, the operating temperature and the operating pressure are fully reduced, making the entire treatment process milder, and improving operation safety.

The treatment method for cephalosporin wastewater of the prevent invention has advantages of simple operation, milder operation conditions and low energy consumption, wherein in the treated cephalosporin wastewater, the removal rate of harmful substances and COD may reach 99%, which reduces the discharge of industrial waste, is more environmentally friendly, and is worthy of widespread application.

Compared with the prior art, the prevent invention has the following beneficial effects:

(1) in the treatment system for wastewater of the prevent invention, through the provision of the micro-interfacial generation system, mass transfer effects between two phases are improved, thereby increasing the interfacial area between a gas phase and a liquid phase so that the oxygen is better fused with the cephalosporin wastewater to form a gas-liquid emulsion for improving oxidation reaction efficiency;

(2) the treatment system for wastewater of the prevent invention adopts a parallel structure of double micro-interfacial generators, which improves the treatment effect of the wastewater, and makes maintenance and disassembly more convenient by arranging positions of the micro-interfacial generators reasonably;

(3) the treatment system for wastewater of the prevent invention has advantages of simple structure, less three kinds of wastes (wastewater, exhaust gas and solid waste), full recovery and utilization of oxygen, small floor space and stable operation; and (4) the treatment system for wastewater of the prevent invention fully reduces the operating temperature and operating pressure, wherein the operating temperature is basically between 100-110° C., and the reaction pressure is maintained between 0.2-0.4 MPa, which achieves effects of low energy consumption and low operating cost.

BRIEF DESCRIPTION OF THE DRAWINGS

Upon reading the following detailed description of preferred embodiments, various advantages and benefits will be apparent to those of ordinary skill in the art. The drawings are for the purpose of explaining preferred embodiments only, and do not constitute improper limitations on the present invention. The same components are also denoted by the same reference numerals throughout the drawings. In the drawings:

FIG. 1 is a structural diagram of a treatment system for cephalosporin wastewater according to an embodiment of the present invention.

DESCRIPTION OF THE PREFERRED EMBODIMENTS

The technical schemes of the present invention will be clearly and completely described below with reference to the accompanying drawings and specific embodiments, but those skilled in the art will understand that the embodiments described below are part of the embodiments of the present invention, rather than all of the embodiments. It is only used to illustrate the present invention and should not be construed as limiting the scope of the present invention. Based on the embodiments of the present invention, all other embodiments obtained by those of ordinary skill in the art without creative efforts shall fall within the protection scope of the present invention. If the specific conditions are not indicated in the examples, it is carried out according to the conventional conditions or the conditions suggested by the manufacturer. The reagents or instruments used without the manufacturer's indication are conventional products that can be purchased from the market.

In the description of the present invention, it should be noted that the terms such as "center", "upper", "lower", "left", "right", "vertical", "horizontal", "inner", "outer", etc., the indicated orientation or positional relationship is based on the orientation or positional relationship shown in the accompanying drawings, which is only for the convenience of describing the present invention and simplifying the description, rather than indicating or implying that the indicated device or element must have a specific orientation or a specific orientation, construction and operation, and therefore should not be construed as limiting the invention. Furthermore, the terms such as "first", "second", and "third" are used for descriptive purposes only and should not be construed to indicate or imply relative importance.

In the description of the present invention, it should be noted that the terms such as "installed", "connected" and "coupled" should be understood in a broad sense, unless otherwise expressly specified and limited, for example, it can be a fixed connection, a detachable connection or an integral connection; or it can be a mechanical connection or an electrical connection; or it can be directly connected or indirectly connected through an intermediate medium, or it can be internal communication between two elements. For those of ordinary skill in the art, the specific meanings of the above terms in the present invention can be understood in specific situations.

In order to illustrate the technical schemes of the present invention more clearly, the following descriptions are given in the form of specific embodiments.

Embodiments

With reference to FIG. 1, a treatment system for cephalosporin wastewater according to an embodiment of the invention, which includes a first flocculation and sedimentation tank 10, a second flocculation and sedimentation tank 20, an alkali reaction tank 30, a PAC reaction tank 40, a PAM reaction tank 50, a wastewater heat exchanger 60, a wastewater heater 70, an oxidation reactor 80 and an air compression device 84 that are connected with each other in sequence.

The wastewater heat exchanger 60 is respectively provided with a material inlet 61, a material outlet 62, a heat source inlet 63 and a heat source outlet 64. An oxidized water from the oxidation reactor 80 enters the wastewater heat exchanger 60 from the heat source inlet 63, and the heat source outlet 64 is connected with a product canister 110.

The material inlet 61 is connected with the PAM reaction tank 50, and the material outlet 62 is connected with the wastewater heater 70. In the wastewater heat exchanger 60, the effect of fully utilizing energy is achieved by exchanging heat between the oxidized water from the oxidation reactor 80 and the cephalosporin wastewater to be treated.

An outer side of the oxidation reactor 80 is provided with a micro-interfacial generation system for dispersing and breaking a gas into bubbles, and the micro-interfacial generation system includes two micro-interfacial generators 82 arranged side by side from top to bottom. Each of the two micro-interfacial generators 82 is provided with a gas inlet 87 and a wastewater inlet 86. The air compression device 84 is communicated with the gas inlet 87, so that an air or oxygen compressed by the air compression device 84 enters the micro-interfacial generator 82 through the gas inlet 87 to achieve pulverization and dispersion of the gas for enhancing mass transfer effects between the two phases.

The air compression device 84 is preferably an air compressor. The air or oxygen compressed by the air compression device 84 is preheated by the gas heating device 83 before entering the micro-interfacial generator 82 to improve the reaction efficiency. The type of the air compressor is selected as a centrifugal air compressor, which is low in cost and easy to use. The liquid phase entering the wastewater inlet 86 is the wastewater recycled from the oxidation reactor 80. In actual operation, a circulation pipeline for circulating the wastewater is provided on the outer side of the oxidation reactor 80, which may ensure the continuous flow of the wastewater into the micro-interfacial generator 82.

The micro-interfacial generator 82 is a pneumatic micro-interfacial generator, and the micro-interfacial generator 82 is reinforced by pipelines. The two micro-interfacial generators 82 are arranged in parallel with each other, so that the mass transfer efficiency is improved.

In order to facilitate the delivery, a delivering pump 100 is disposed between the PAM reaction tank 50 and the wastewater heat exchanger 60.

An upper side of the oxidation reactor 80 is provided with an oxidized water outlet 81, and the oxidized water from the oxidized water outlet 81 first passes through a gas-liquid separation tank 90 for gas-liquid separation and then comes out from a bottom of the gas-liquid separation tank 90 to be connected with the heat source inlet 63 through a pipeline, so as to realize that the oxidized water is delivered to the wastewater heat exchanger 60 for heat exchange, and is cooled and delivered to the product canister 110 for storage after heat exchange. The water coming out of the product canister 110 continues to undergo subsequent advanced processing.

The treatment system further includes a first facultative biological tank 120, a second facultative biological tank 130, a first aerobic tank 140 and a second aerobic tank 150. The wastewater from the product canister 110 is treated in the first/second facultative biological tank 120/130 and the first/second aerobic tank 140/150 in turn. The facultative microorganisms may realize the conversion of macromolecular organic matter in the treated wastewater into micromolecular organic matter, while the aerobic microorganisms directly decomposes the small molecules, and the facultative microorganisms and the aerobic microorganisms work together. to remove various organic substrates, nitrates and nitrites in the wastewater.

In the above embodiment, a number of the micro-interfacial generators 82 is not limited, so additional micro-interfacial generators may further be added in order to increase the effect of dispersion and mass transfer. In particular, the installation position of the micro-interfacial generators 82 is not limited, which is externally-built or built-in, wherein when the micro-interfacial generators are built-in, they may also be installed on the side wall of the kettle to be opposed to each other, so as to achieve hedging of the micro-bubbles coming out of the outlet of the micro-interfacial generators. When the micro-interfacial generators are externally-built, each of the micro-interfacial generators is preferably arranged in parallel with each other.

In the above two embodiments, a number of the pumps is not limited, which is arranged on corresponding positions according to actual needs.

The working process and principle of the treatment system for cephalosporin wastewater according to the invention are briefly described below:

First, the wastewater passes through the first flocculation and sedimentation tank 10, the second flocculation and sedimentation tank 20, the alkali reaction tank 30, the PAC reaction tank 40 and the PAM reaction tank 50 in sequence for pre-treatment, and flocculants are added in the first/second flocculation and sedimentation tank 10/20 for flocculation and sedimentation, wherein the PAC reaction tank 40 is mainly added with aluminum chloride or aluminum hydroxychloride, and the PAM reaction tank 50 is mainly added with polyacrylamide.

Then, the cephalosporin wastewater is sent into the wastewater heat exchanger 60 by the delivery pump 100 for heat exchange, and is further heated by the wastewater heater 70. The heated cephalosporin wastewater enters the oxidation reactor 80 for oxidation. After the compressed air or oxygen enters from the micro-interfacial generators 82 on the side of the oxidation reactor, the compressed air or oxygen is dispersed and crushed into micro bubbles by the micro-interfacial generators 82, so as to achieve the effect of strengthening the oxidation reaction and improve the mass transfer efficiency of the phase interface. In order to improve the safety, an exhaust vent 85 is disposed on a top of the oxidation reactor 80.

Finally, after the oxidized water of the oxidation reactor 80 is subjected to gas-liquid separation by the gas-liquid separation tank 90 from the oxidized water outlet 81, and then is returned to the wastewater heat exchanger 60 for heat exchange and cooled down to be further delivered to the product canister 110 for storage. The wastewater from the product canister 110 then passes through the first facultative biological tank 120, the second facultative biological tank 130, the first aerobic tank 140 and the second aerobic tank 150. The wastewater from the product canister 110 is treated in the first/second facultative biological tank 120/130 and the first/second aerobic tank 140/150 in turn. The facultative microorganisms may realize the conversion of macromolecular organic matter in the treated wastewater into micromolecular organic matter, while the aerobic microorganisms directly decomposes the small molecules, and the facultative microorganisms and the aerobic microorganisms work together to remove various organic substrates, nitrates and nitrites in the wastewater.

The above treatment steps are cycled back and forth to make the entire treatment system run smoothly.

The treatment system of the invention ensures that the wet oxidation is carried out under relatively-mild pressure and temperature conditions by providing the micro-interfacial generation system. Compared with the treatment system for cephalosporin wastewater in the prior art, the treatment system of the invention has fewer equipment components, small footprint, low energy consumption, low cost, high safety and controllable reaction, and is worthy of wide popularization and application. In summary, the treatment system for cephalosporin wastewater of the invention has high treatment power, and after the treatment performed by the treatment system, the invention may ensure a relatively-high treatment effect under the condition of relatively-low energy consumption with a removal rate of harmful substances and COD reaching 99%.

Finally, it should be noted that the above embodiments are merely used to explain the technical schemes of the present invention, but not to limit them. Although the present invention has been described in detail with reference to the foregoing embodiments, those of ordinary skill in the art should understand that: the technical schemes described in the foregoing embodiments can still be modified, or some or all of the technical features thereof can be equivalently replaced. However, these modifications or replacements do not make the essence of the corresponding technical schemes deviate from the scope of technical schemes of the embodiments of the present invention.

What is claimed is:

1. A treatment system for cephalosporin wastewater, comprising:
    a flocculation and sedimentation device, an alkali reaction tank, a PAC reaction tank, a PAM reaction tank, a wastewater heat exchanger, a wastewater heater and an oxidation reactor that are connected with each other in sequence, wherein the wastewater heat exchanger is provided with a material inlet, a material outlet, a heat source inlet and a heat source outlet;
    an oxidized water from the oxidation reactor enters the wastewater heat exchanger from the heat source inlet, the heat source outlet is connected with a product canister, the product canister is connected with a facultative biological device the material inlet is connected with the PAM reaction tank, and the material outlet is connected with the wastewater heater;
    an outer side of the oxidation reactor is provided with a micro-interfacial generation system for dispersing and breaking a gas into bubbles, and the micro-interfacial generation system comprises two pneumatic micro-interfacial generators that are arranged side-by-side from top to bottom and are connected in parallel with each other;
    wherein each of the two pneumatic micro-interfacial generators is provided with a gas inlet and a wastewater inlet, a wastewater recycled from the oxidation reactor enters the wastewater inlet, and a supplemental fresh air or oxygen enters the gas inlet.

2. The treatment system according to claim 1, wherein the flocculation and sedimentation device comprises a first flocculation and sedimentation tank and a second flocculation and sedimentation tank that are used to settle and separate flocs in the wastewater; and the first flocculation and sedimentation tank is connected with the second flocculation and sedimentation tank.

3. The treatment system according to claim 2, wherein a delivering pump is disposed between the PAM reaction tank and the wastewater heat exchanger.

4. The treatment system according to claim 1,
    wherein the facultative biological device comprises a first facultative biological tank and a second facultative biological tank, and the first facultative biological tank is connected with the second facultative biological tank.

5. The treatment system according to claim 4, further comprising:

an aerobic device that uses aerobic microorganisms for decomposing molecular substances in the wastewater, wherein the wastewater treated by the facultative biological device flows through the aerobic device;

wherein the aerobic device comprises a first aerobic tank and a second aerobic tank, the first aerobic tank is connected with the first facultative biological tank, and the second aerobic tank is connected with the second facultative biological tank.

6. The treatment system according to claim 1, further comprising:

an air compression device, wherein the air compression device is connected with the gas inlet, and a gas heating device is disposed on a pipeline where the air compression device is connected with the gas inlet.

7. A treatment method for cephalosporin wastewater using the treatment system according to claim 1, comprising steps of:

introducing the cephalosporin wastewater into the oxidation reactor after being heated, and introducing a compressed air or a compressed oxygen into the oxidation reactor for performing a wet-oxidation process;

first dispersing and crushing the compressed air or the compressed oxygen entering the oxidation reactor by the plurality of micro-interfacial generators;

wherein a temperature of the wet-oxidation process is controlled to be between 100° C. and 110° C., and a pressure of the wet-oxidation process is controlled to be between 0.2 MPa and 0.4 MPa.

* * * * *